(12) United States Patent
Kuwata et al.

(10) Patent No.: US 10,707,497 B2
(45) Date of Patent: Jul. 7, 2020

(54) FUEL CELL

(71) Applicant: NISSAN MOTOR CO., LTD., Yokohama-shi, Kanagawa (JP)

(72) Inventors: Shigemasa Kuwata, Kanagawa (JP); Takanori Oku, Kanagawa (JP); Mitsutaka Abe, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 54 days.

(21) Appl. No.: 15/741,351

(22) PCT Filed: Jul. 3, 2015

(86) PCT No.: PCT/JP2015/069330
§ 371 (c)(1),
(2) Date: Jan. 2, 2018

(87) PCT Pub. No.: WO2017/006403
PCT Pub. Date: Jan. 12, 2017

(65) Prior Publication Data
US 2018/0226660 A1    Aug. 9, 2018

(51) Int. Cl.
*H01M 8/0276* (2016.01)
*H01M 8/0202* (2016.01)
(Continued)

(52) U.S. Cl.
CPC .......... *H01M 8/0202* (2013.01); *H01M 8/02* (2013.01); *H01M 8/0247* (2013.01); *H01M 8/0273* (2013.01); *H01M 8/0276* (2013.01); *H01M 8/1004* (2013.01); *H01M 8/242* (2013.01); *H01M 8/0284* (2013.01); *H01M 8/10* (2013.01); *H01M 2008/1095* (2013.01)

(58) Field of Classification Search
CPC . H01M 8/0202; H01M 8/0273; H01M 8/0276
See application file for complete search history.

(56) References Cited

U.S. PATENT DOCUMENTS

2013/0196253 A1*  8/2013  De Rose ............. H01M 8/2425
                                                       429/510
2014/0162164 A1   6/2014  Jin
(Continued)

FOREIGN PATENT DOCUMENTS

JP    2007-120380 A    5/2007
JP    2009-170273 A    7/2009
(Continued)

*Primary Examiner* — Jonathan G Leong
(74) *Attorney, Agent, or Firm* — Foley & Lardner LLP

(57) ABSTRACT

A fuel cell includes a membrane electrode assembly constituted of an electrolyte membrane and an electrode layer, a frame portion disposed along an outer periphery of the membrane electrode assembly, and separators that include gas flow passages to supply the membrane electrode assembly with fuel gas, wherein the membrane electrode assembly is interposed by a pair of the separators, and the separators include adhesion regions bonded to the frame portion via an adhesive, and reduced portions where distances between the separators and the frame portion are shorter than distances between the separators and the frame portion at other adhesion regions in the adhesion regions.

12 Claims, 9 Drawing Sheets

(51) Int. Cl.
*H01M 8/02* (2016.01)
*H01M 8/0247* (2016.01)
*H01M 8/242* (2016.01)
*H01M 8/0273* (2016.01)
*H01M 8/1004* (2016.01)
*H01M 8/10* (2016.01)
*H01M 8/0284* (2016.01)
*H01M 8/1018* (2016.01)

(56) References Cited

U.S. PATENT DOCUMENTS

2015/0311560 A1 10/2015 Kageyama
2016/0072136 A1 3/2016 Kageyama

FOREIGN PATENT DOCUMENTS

| JP | 2009-231170 A | 10/2009 |
| JP | 2009-252420 A | 10/2009 |
| JP | 2010-129477 A | 6/2010 |
| JP | 2014-127393 A | 7/2014 |
| WO | WO 2014/080761 A | 5/2014 |
| WO | WO 2014/174959 A1 | 10/2014 |

\* cited by examiner

FUEL CELL

TECHNICAL FIELD

The present invention relates to a fuel cell that generates electricity through supply of anode gas and cathode gas.

BACKGROUND ART

JP2009-231170A discloses a fuel cell that includes a membrane electrode assembly, which has a resin frame, and separators, which are disposed adjacent to the membrane electrode assembly. With this fuel cell, the separator is bonded to the resin frame of the membrane electrode assembly via an adhesive.

SUMMARY OF INVENTION

With the above-described fuel cell, the adhesive has a seal function to prevent a leakage of gas and water vapor in the fuel cell to outside, in addition to the function of adhesion of the members. Thus, it is important for the fuel cell to enhance the sealing performance with the adhesive from an aspect of preventing the leakage of gas or a similar fluid from the inside of the fuel cell. Although thinning a thickness of the adhesive between the members is considered to reduce the leakage of the gas or a similar fluid, thinning the adhesive thickness to enhance the seal function possibly results in deterioration of adhesive strength.

An object of the present invention is to provide a fuel cell that can reduce a leakage of gas and water vapor while securing adhesive strength between members.

According to an aspect of this invention, a membrane electrode assembly constituted of an electrolyte membrane and an electrode layer, a frame portion disposed along an outer periphery of the membrane electrode assembly, and separators that include gas flow passages to supply the membrane electrode assembly with fuel gas, wherein the membrane electrode assembly is interposed by a pair of the separators, and the separators include adhesion regions bonded to the frame portion via an adhesive, and reduced portions where distances between the separators and the frame portion are shorter than distances between the separators and the frame portion at other adhesion regions in the adhesion regions.

DESCRIPTION OF EMBODIMENTS

The following describes embodiments of the present invention with reference to the drawings or a similar reference.

First Embodiment

A fuel cell is constituted by interposing an electrolyte membrane by an anode electrode as a fuel electrode and a cathode electrode as an oxidant electrode. The fuel cell generates electricity using anode gas (fuel gas) containing a hydrogen supplied to the anode electrode and cathode gas (fuel gas) containing an oxygen supplied to the cathode electrode. An electrode reaction progressing in both electrodes of the anode electrode and the cathode electrode is as follows.

Anode electrode: $2H_2 \rightarrow 4H^+ + 4e^-$ (1)

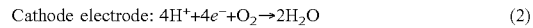
Cathode electrode: $4H^+ + 4e^- + O_2 \rightarrow 2H_2O$ (2)

Through these electrode reactions (1) and (2), the fuel cell generates an electromotive force around 1 V (bolt).

Figure 1:
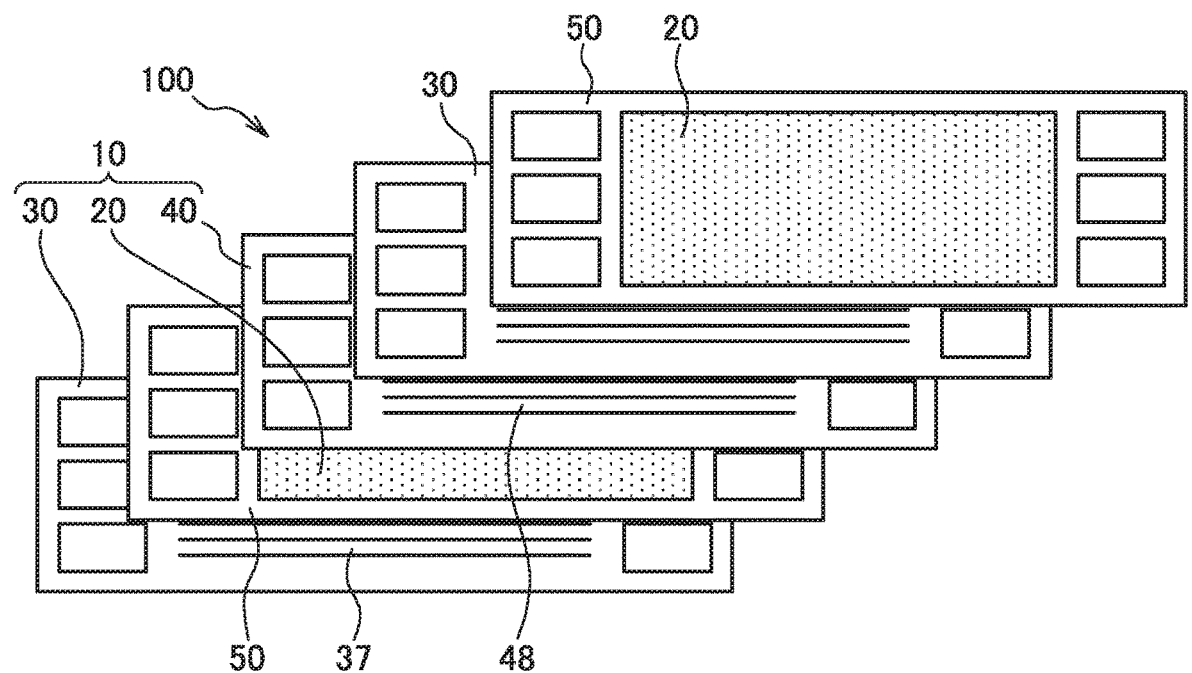
FIG. 1 is a schematic configuration diagram of a fuel cell stack according to a first embodiment of the present invention.

FIG. 1 is an exploded view illustrating a schematic configuration of a fuel cell stack 100 according to the first embodiment.

The fuel cell stack 100 illustrated in FIG. 1 is a fuel cell stack used for a moving vehicle such as an electric vehicle and a hybrid vehicle. Note that, the fuel cell stack 100 is not limited to the use for, for example, an automobile but may be used as a power supply for various electrical devices.

The fuel cell stack 100 is a layer-built cell configured by laminating a plurality of fuel cells 10 as a single cell.

The fuel cell 10 constituting the fuel cell stack 100 includes a membrane electrode assembly (MEA) 20, an anode separator 30 disposed at one surface of the MEA 20, and a cathode separator 40, which is disposed at the other surface of the MEA 20. Thus, the fuel cell 10 is constituted by interposing the MEA 20 by the pair of separators 30 and 40.

Figure 2:
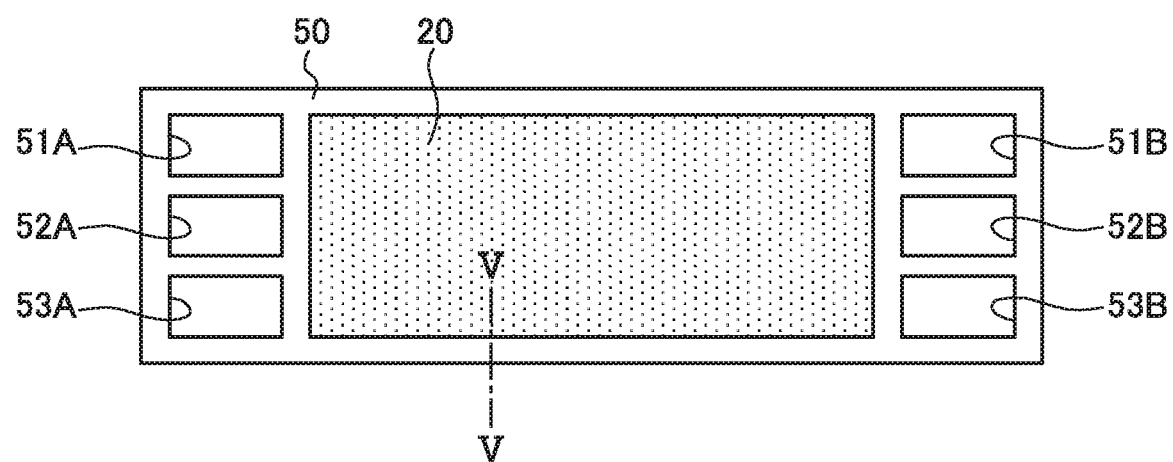
FIG. 2 is a front view of a membrane electrode assembly constituting a fuel cell.
Figure 5:
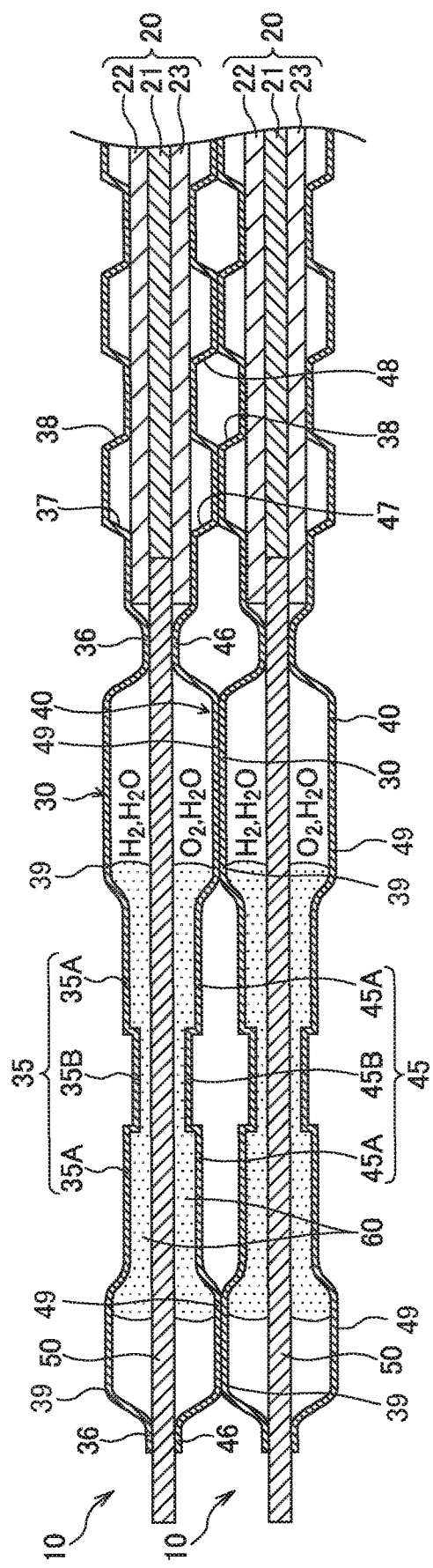
FIG. 5 is a partial vertical cross-sectional view of the fuel cell stack.

As illustrated in FIG. 2 and FIG. 5, the MEA 20 is constituted of an electrolyte membrane 21, an anode electrode 22 disposed at one surface of the electrolyte membrane 21, and a cathode electrode 23 disposed at the other surface of the electrolyte membrane 21. It should be noted that, FIG. 2 is a front view of the membrane electrode assembly 20 constituting the fuel cell 10, and FIG. 5 is a partial vertical cross-sectional view of the fuel cell 10 taken along a position V-V in FIG. 2.

The electrolyte membrane 21 is a proton-conductive ion exchange membrane made of a fluorine-based resin. The anode electrode 22 is, in the order from the electrolyte membrane 21 side, constituted by disposing an electrode catalyst layer made of an alloy such as a platinum, a microporous layer made of a fluororesin, a carbon, and a similar material, and a gas diffusion layer made of a carbon paper and a similar material. Similar to the anode electrode 22, the cathode electrode 23 is, in the order from the electrolyte membrane 21 side, also constituted by disposing the electrode catalyst layer, the microporous layer made, and the gas diffusion layer.

The MEA 20 includes a frame portion 50 made of a resin along a joined body outer periphery. The frame portion 50 is a framing body made of, for example, a synthetic resin and is formed integrally with the MEA 20. The frame portion 50 may be configured as a plate-shaped member having rigidity or may be configured as a sheet-shaped member having flexibility.

At one end side (the left side in FIG. 2) of the frame portion 50, in the order from the above, an anode gas supply manifold 51A, a cooling water supply manifold 52A, and a cathode gas supply manifold 53A are formed. At the other end side (the right side in FIG. 2) of the frame portion 50, in the order from the above, an anode gas exhaust manifold 51B, a cooling water exhaust manifold 52B, and a cathode gas exhaust manifold 53B are formed.

Figure 3:
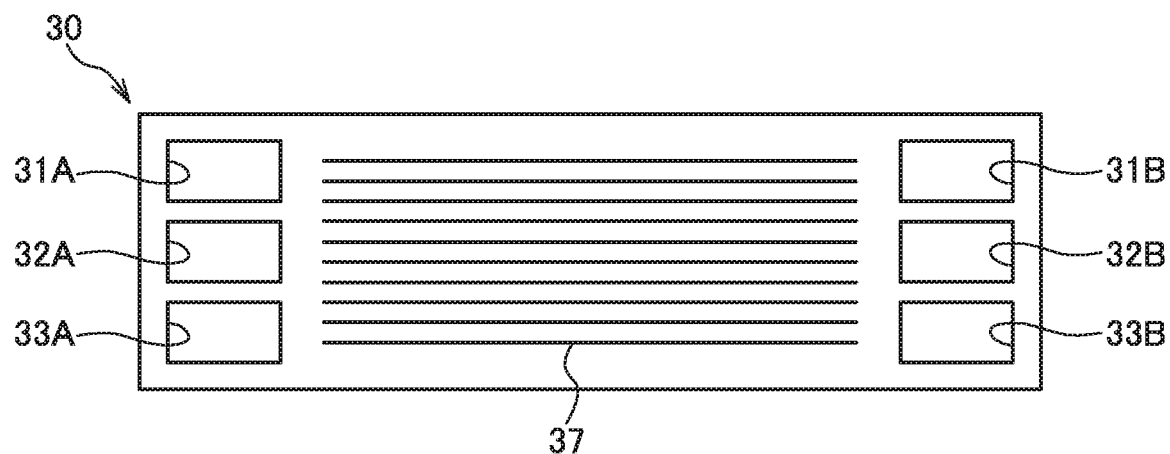
FIG. 3 is a front view of an anode separator constituting the fuel cell.

As illustrated in FIG. 3 and FIG. 5, the anode separator 30 is a plate-shaped member made of a conductive material such as a metal. The anode separator 30 includes an anode gas flow passage 37 to flow the anode gas on the MEA side surface and a cooling water flow passage 38 to flow the cooling water on a surface on a side opposite to the MEA side.

At one end side (the left side in FIG. 3) of the anode separator 30, in the order from the above, an anode gas supply manifold 31A, a cooling water supply manifold 32A, and a cathode gas supply manifold 33A are formed. At the other end side (the right side in FIG. 3) of the anode separator 30, in the order from the above, an anode gas exhaust manifold 31B, a cooling water exhaust manifold 32B, and a cathode gas exhaust manifold 33B are formed.

The anode gas supplied from the anode gas supply manifold 31A passes through the anode gas flow passage 37 and flows out of the anode gas exhaust manifold 31B. The cooling water supplied from the cooling water supply manifold 32A passes through the cooling water flow passage 38 and flows out of the cooling water exhaust manifold 32B.

Figure 4:
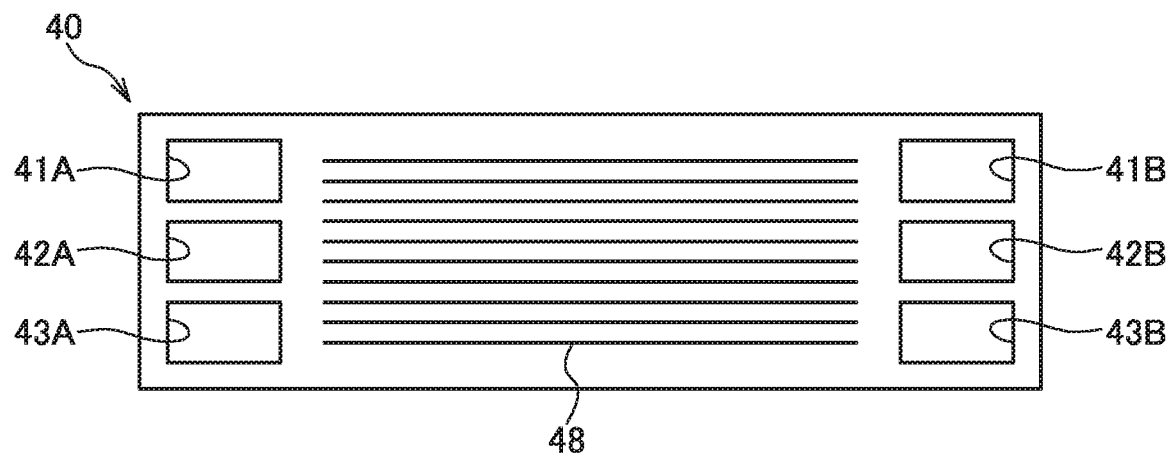
FIG. 4 is a front view of a cathode separator constituting the fuel cell.

As illustrated in FIG. 4 and FIG. 5, the cathode separator 40 is a plate-shaped member made of a conductive material such as a metal. The cathode separator 40 includes a cathode gas flow passage 47 to flow the cathode gas on the MEA side surface and a cooling water flow passage 48 to flow the cooling water on a surface on a side opposite to the MEA side.

At one end side (the left side in FIG. 4) of the cathode separator 40, in the order from the above, an anode gas supply manifold 41A, a cooling water supply manifold 42A, and a cathode gas supply manifold 43A are formed. At the other end side (the right side in FIG. 4) of the cathode separator 40, in the order from the above, an anode gas exhaust manifold 41B, a cooling water exhaust manifold 42B, and a cathode gas exhaust manifold 43B are formed.

The cathode gas supplied from the cathode gas supply manifold 43A passes through the cathode gas flow passage 47 and flows out of the cathode gas exhaust manifold 43B. The cooling water supplied from the cooling water supply manifold 42A passes through the cooling water flow passage 48 and flows out of the cooling water exhaust manifold 42B.

In the case where the fuel cells 10 including the MEA 20, the anode separator 30, and the cathode separator 40 are laminated to configure the fuel cell stack 100, the anode gas supply manifolds 31A, 41A, and 51A are aligned in the lamination direction to function as one passage for anode gas supply. At this time, the cooling water supply manifolds 32A, 42A, and 52A function as one passage for cooling water supply, and the cathode gas supply manifolds 33A, 43A, and 53A function as one passage for cathode gas supply. Similarly, the anode gas exhaust manifolds 31B, 41B, and 51B, the cooling water exhaust manifolds 32B, 42B, and 52B, and the cathode gas exhaust manifolds 33B, 43B, and 53B each function as a passage for anode gas exhaust, a passage for cooling water exhaust, and a passage for cathode gas exhaust.

It should be noted that, as illustrated in FIG. 5, in the adjacent two fuel cells 10, the respective cooling water flow passages 38 and 48 disposed at the anode separator 30 of the one fuel cell and the cathode separator 40 of the other fuel cell 10 are disposed so as to face one another. The cooling water flow passages 38 and 48 thus disposed configures one cooling passage.

As illustrated in FIG. 5, the fuel cell 10 is formed by adhesion of the anode separator 30 and the cathode separator 40 to the frame portion 50 with an adhesive 60. With the anode separator 30 and the cathode separator 40 adhered to the frame portion 50, the anode separator 30 is disposed such that the surface on the anode gas flow passage 37 side is adjacent to the surface at one side of the MEA 20, and the cathode separator 40 is disposed such that the surface on the cathode gas flow passage 47 side is adjacent to the surface at the other side of the MEA 20.

In these separators 30 and 40, the adhesive 60 is disposed surrounding the separator outer edges and the peripheral areas of the various manifolds. The adhesive 60 has a function as a sealing material to seal the respective members, in addition to a function of adhesion between the respective members. Accordingly, as the adhesive 60, an olefin-based adhesive, a silicon-based adhesive, or a similar adhesive having the adhesion function and the seal function is employed. Although these adhesives are gels before hardening, the adhesives become a solid state with elasticity after the hardening.

The following describes distinctive configurations of the anode separator 30 and the cathode separator 40 of the fuel cell 10 of this embodiment with reference to FIG. 5. The anode separator 30 and the cathode separator 40 have features at parts where the adhesive 60 is disposed.

The anode separator 30 includes an adhesion region 35 at a part to be bonded to the frame portion 50 via the adhesive 60. The adhesion region 35 is formed along the separator outer edge corresponding to the position where the adhesive 60 is disposed.

The adhesion region 35 of the anode separator 30 includes flat portions 35A and a protrusion 35B. The thickness of the adhesive 60 between the flat portion 35A and the frame portion 50 becomes constant. The protrusion 35B projects to the frame side with respect to the flat portion 35A; therefore, the thickness of the adhesive 60 at the protrusion 35B is thinner than the thickness at this flat portion 35A. In other words, the anode separator 30 includes the reduced portion (the protrusion 35B) where the distance between the separator 30 and the frame portion 50 is shorter than a distance between the separator 30 and the frame portion 50 at the other adhesion regions (the flat portions 35A) in the adhesion region 35.

The protrusion 35B is positioned at the center part of the adhesion region 35 and the flat portions 35A are positioned at positions inside and outside with respect to the center part in an inner-outer direction. The inner-outer direction means a direction from the inner position close to the MEA 20 to the outer position far from the MEA 20. In the adhesion region 35, the protrusion 35B and the flat portions 35A, which are positioned inside and outside with respect to the protrusion 35B, are formed continuously without separation.

Thus, in the adhesion region 35, the region other than the protrusion 35B is equivalent to the regions of the flat portions 35A.

It should be noted that, the anode separator 30 has abutting portions 36 (first abutting portions) abutting on the frame portion 50. Height positions of the flat portions 35A and the protrusion 35B are specified with respect to the abutting portions 36. When the abutting portions 36 of the anode separator 30 abut on the frame portion 50, a clearance is formed between the flat portions 35A and the protrusion 35B and the frame portion 50, and the adhesive 60 is provided in this clearance.

The flat portions 35A in the adhesion region 35 function as regions to secure the adhesive thickness of the adhesive 60. The flat portion 35A has the adhesive thickness configured to be an appropriate thickness so as to enhance the adhesion function. Thinning the adhesive thickness of the protrusion 35B compared with the flat portion 35A in the adhesion region 35 narrows down a region through which the anode gas and the water vapor in the fuel cell 10 is passable. Thus, the protrusion 35B functions as the reduced portion to reduce the passing of the fluid.

The anode separator 30 includes abutting portions 39 (second abutting portions), which abut on the cathode separator 40 different from this separator, at the inside and the outside of the adhesion region 35 in the inner-outer direction. With the laminated fuel cells 10, the abutting portions 39 of the anode separator 30 abut on abutting portions 49 of the cathode separator 40. An interval between the abutting portion 39 of the anode separator 30 and the frame portion 50 is configured larger than an interval between the anode separator 30 at the adhesion region 35 and the frame portion 50.

As illustrated in FIG. 5, the adhesive 60 overflows from the adhesion region 35 sides to the abutting portion 39 sides, and spaces between the abutting portions 39 and the frame portion 50 function as adhesive accumulation portions to accumulate the extra adhesive 60. Thus, the abutting portions 39 is equivalent to the regions different from the adhesion region 35 in the anode separator 30. That is, the adhesion region 35 includes the flat portions 35A and the protrusion 35B and does not include the abutting portions 39.

Similar to the anode separator 30, the cathode separator 40 also includes an adhesion region 45 constituted of flat portions 45A and a protrusion 45B, abutting portions 46 (first abutting portions) abutting on the frame portion 50, and abutting portions 49 (second abutting portions) abutting on the anode separator 30. The flat portions 45A, the protrusion 45B, and the abutting portions 46 and 49 of the cathode separator 40 achieve functions identical to those of the flat portions 35A, the protrusion 35B, and the abutting portions 36 and 39 of the anode separator 30.

It should be noted that, the protrusion 35B of the anode separator 30 and the protrusion 45B of the cathode separator 40 are disposed at the positions facing one another across the frame portion 50.

The fuel cell 10 according to the above-described first embodiment can provide the following effects.

The fuel cell 10 according to this embodiment includes the MEA 20, the frame portion 50, which is disposed along the outer periphery of the MEA 20, and the anode separator 30 and the cathode separator 40, which are bonded to the frame portion 50 via the adhesive 60. At the adhesion regions 35 and 45 of these separators 30 and 40, the reduced portions (the protrusions 35B and 45B), which reduce an amount of passing of, for example, the gas (the fluid) in the adhesive 60. Thus, the separators 30 and 40 include the adhesion regions 35 and 45, which are bonded to the frame portion 50 via the adhesive 60, and the reduced portions (the protrusions 35B and 45B), which shorten the distances between the separators 30 and 40 and the frame portion 50 in the adhesion regions 35 and 45 compared with the other adhesion regions. More specifically, the adhesion regions 35 and 45 of the respective separators 30 and 40 include the flat portions 35A and 45A where the adhesive thickness between the separators 30 and 40 and the frame portion 50 is made to be constant and the protrusions 35B and 45B where the adhesive thicknesses is made to be thinner than those at the flat portions 35A and 45A.

The fuel cell 10 thus configured allows the adhesive thicknesses between the flat portions 35A and 45A of the respective separators 30 and 40 and the frame portion 50 to be a desired thickness. This prevents the excessively thin and excessively thick adhesive thickness, thereby ensuring securing the adhesive strength between the members with the adhesive 60. Furthermore, since the adhesive thicknesses between the protrusions 35B and 45B of the respective separators 30 and 40 and the frame portion 50 are thinned compared with the adhesive thicknesses at the flat portions 35A and 45A, the cross-sectional area of the adhesive 60 is reduced at the regions where the protrusions 35B and 45B are present, thus reducing the passing of the gas or a similar fluid. As illustrated in FIG. 5, this ensures reducing the anode gas ($H_2$), the cathode gas ($O_2$), and the water vapor ($H_2O$) present in the fuel cell 10 passing through the inside of the adhesive 60 and leaking to the outside with more certainty. As described above, the fuel cell 10 enhances the seal function by the adhesive 60 by the protrusions 35B and 45B as the reduced portions and secures the adhesive strength of the adhesive 60 at the regions other than the protrusions 35B and 45B in the adhesion regions 35 and 45.

It should be noted that, the fuel cell 10 can reduce entrance of air to the anode electrode from the outside through the adhesive 60 on the anode separator side. This reduces hydrogen front deterioration of the fuel cell 10 at, for example, a system start. Furthermore, since the protrusions 35B and 45B dig into the adhesive 60, a movement of the adhesive 60 outside in the inner-outer direction due to gas pressure inside the fuel cell 10 or a similar cause is reduced.

It is considered to employ the olefin-based adhesive, which is comparatively expensive and has a high gas barrier property, as the adhesive 60 for the fuel cell system. Since the fuel cell 10 using the separators 30 and 40 that include the devised adhesion regions 35 and 45 can reduce the passing of the gas or a similar fluid based on the separator structure, the amount of used adhesive 60 can be reduced by, for example, narrowing down an adhesion width of the olefin-based adhesive. Consequently, the downsizing of the fuel cell 10 and the reduction in the production cost can be achieved. Although the gas barrier property is inferior to the olefin-based adhesive, the use of a comparatively inexpensive silicon-based adhesive as the adhesive 60 for the fuel cell 10 also allows achieving both of strengthening the adhesion between the members and reducing the leakage of the gas or a similar fluid.

Furthermore, in the fuel cell 10, the protrusion 35B of the adhesion region 35 in the anode separator 30 and the protrusion 45B of the adhesion region 45 in the cathode separator 40 are disposed at the positions facing one another across the frame portion 50.

The fuel cell stack 100 is configured by stacking the plurality of fuel cells 10 to which a pressing force is applied.

This pressing force preferably acts in an in-plane direction of the fuel cell 10 uniformly as much as possible. With the fuel cell 10, the pressing force during the stacking mutually acts between the separators 30 and 40 and the frame portion 50 not only the parts where the separators 30 and 40 contact the frame portion 50, but also a part where the protrusions 35B and 45B are mutually opposed. This allows dispersing the pressing force during the stacking in the in-plane direction of the fuel cell 10, thereby ensuring reducing a local concentration of the pressing force. Consequently, a deformation of the respective separators 30 and 40 during the stacking or a similar failure can be prevented.

Figure 6:
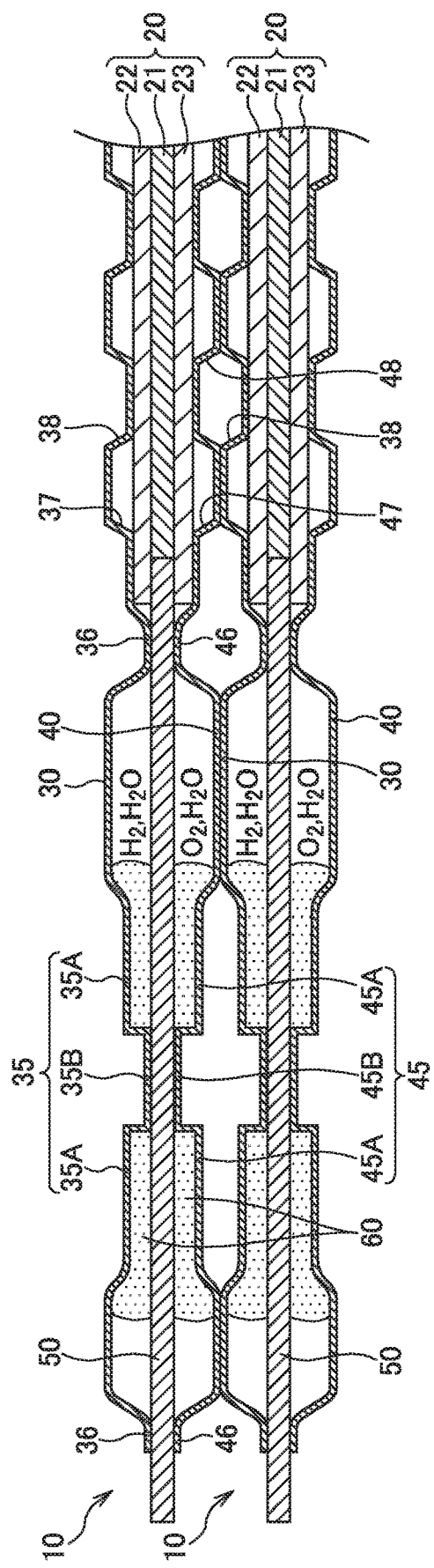
FIG. 6 is a partial vertical cross-sectional view of a fuel cell stack according to a modification of the first embodiment.

The following describes a modification of the fuel cell 10 according to the first embodiment with reference to FIG. 6. FIG. 6 is a partial cross-sectional view of the fuel cell 10 according to the modification.

With the fuel cell 10 illustrated in FIG. 6, the protrusion 35B of the adhesion region 35 in the anode separator 30 is configured such that the bottom surface of the protrusion 35B abuts on the frame portion 50. Similarly, the protrusion 45B of the adhesion region 45 in the cathode separator 40 is configured such that the bottom surface of the protrusion 45B abuts on the frame portion 50.

The fuel cell 10 thus configured only forms a considerably thin adhesive layer between the protrusions 35B and 45B and the frame portion 50. The gas and the water vapor in the fuel cell 10 hardly pass through these parts. This ensures further enhancing the sealing performance of the adhesive 60 at the adhesion regions 35 and 45.

Furthermore, with the fuel cell 10, since the opposed protrusions 35B and 45B abut on the frame portion 50, the pressing force during the stacking is surely transmitted to the frame portion 50 via the protrusions 35B and 45B. This allows dispersing the pressing force during the stacking in the in-plane direction of the fuel cell 10. The deformation of the respective separators 30 and 40 or a similar failure can be prevented with more certainty.

It should be noted that, in the case where the anode separator 30 and the cathode separator 40 include the protrusions 35B and 45B as illustrated in FIG. 6, it is not always necessary that the separators 30 and 40 form the abutting portions 36 and 46 to specify the heights of the adhesion regions 35 and 45. That is, the protrusions 35B and 45B themselves function as members to specify the heights of the flat portions 35A and 45A in the adhesion regions 35 and 45.

Second Embodiment

Figure 7:
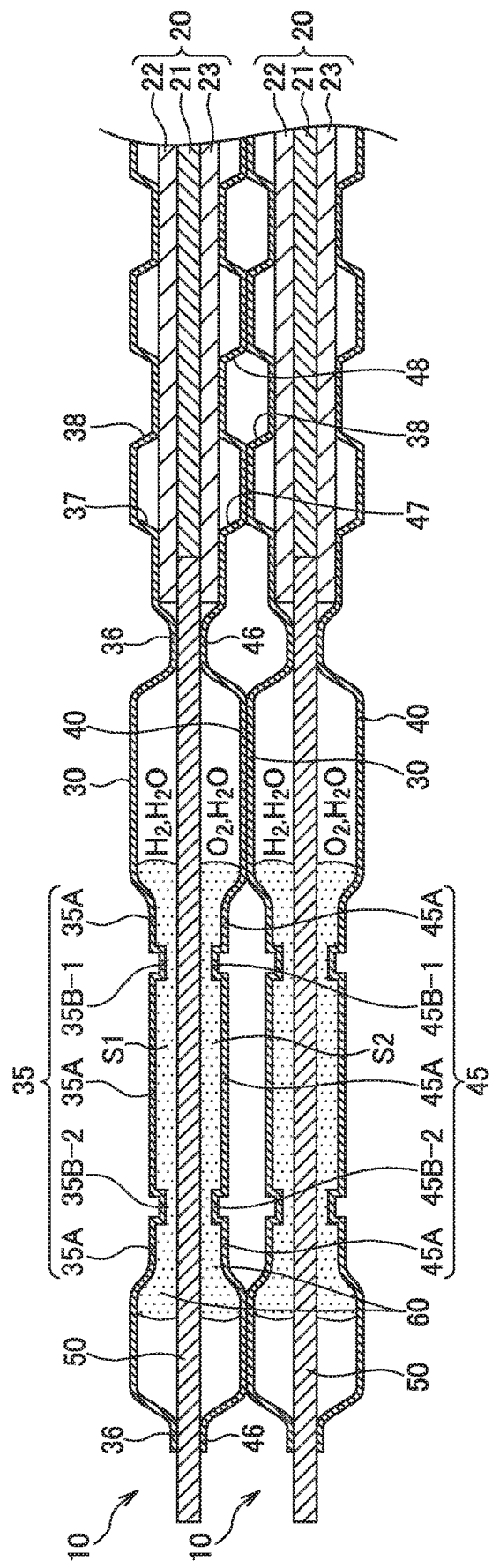
FIG. 7 is a partial vertical cross-sectional view of a fuel cell stack according to a second embodiment of the present invention.

The following describes the fuel cell 10 according to a second embodiment of the present invention with reference to FIG. 7. In the following embodiment, like reference numerals designate configurations and the like with functions identical to those in the first embodiment, and therefore such configurations will not be further elaborated here.

The fuel cell 10 according to the second embodiment includes the two protrusions 35B at the adhesion region 35 in the anode separator 30. The protrusions 35B separate in the inner-outer direction from the inner position close to the MEA 20 to the outside. While a first protrusion 35B-1 is disposed at an inner position with respect to the center of the adhesion region 35, the second protrusion 35B-2 is disposed at an outer position with respect to the center of the adhesion region 35.

The cathode separator 40 is also configured similar to the anode separator 30. The cathode separator 40 includes two protrusions 45B separating in the inner-outer direction at the adhesion region 45. While a first protrusion 45B-1 is disposed at an inner position with respect to the center of the adhesion region 45, a second protrusion 45B-2 is disposed at an outer position with respect to the center of the adhesion region 45.

As described above, the fuel cell 10 includes the plurality of protrusions 35B and 45B, which separate in the inner-outer direction, at the adhesion regions 35 and 45 in the respective separators 30 and 40. At least one of the protrusions 35B and 45B is disposed at each of the position inside with respect to the center of the adhesion regions 35 and 45 and the position outside with respect to the center of the adhesion regions 35 and 45.

It should be noted that, the first protrusion 35B-1 and the first protrusion 45B-1 are disposed at positions facing one another across the frame portion 50 and the second protrusion 35B-2 and the second protrusion 45B-2 are disposed at positions facing one another across the frame portion 50.

The fuel cell 10 according to the above-described second embodiment can provide the following effects.

The fuel cell 10 according to the embodiment includes the plurality of (for example, two) protrusions 35B and 45B, which separate in the inner-outer direction, at the adhesion regions 35 and 45 in the respective separators 30 and 40. More specifically, while the first protrusions 35B-1 and 45B-1 are disposed at the inner positions with respect to the centers of the adhesion regions 35 and 45, the second protrusions 35B-2 and 45B-2 are disposed at the outer positions with respect to the centers of the adhesion regions 35 and 45.

Thus, by disposing the plurality of protrusions 35B and 45B at the adhesion regions 35 and 45 causes the gas and the water vapor in the fuel cell 10 to be less likely to pass through the inside of the adhesive 60. This ensures further enhancing the sealing performance of the adhesive 60 in the adhesion regions 35 and 45. Since the protrusions 35B and 45B dig into the adhesive 60, the adhesive 60 never moves due to a gas pressure in the fuel cell 10 or a similar cause.

Furthermore, with the fuel cell 10, the first protrusion 35B-1 is opposed to the first protrusion 45B-1 and the second protrusion 35B-2 is opposed to the second protrusion 45B-2. This ensures dispersing the pressing force during the stacking in the in-plane direction of the fuel cell 10. Consequently, the deformation of the respective separators 30 and 40 during the stacking or a similar failure can be prevented.

Since the respective members are laminated while the pressing force is acted during the production of the fuel cell 10, the respective separators 30 and 40 and the frame portion 50 are adhered at the adhesion regions 35 and 45 in the respective separators 30 and 40 while the adhesive 60 before hardening is squashed. In this embodiment, the first protrusions 35B-1 and 45B-1 are formed at the inner positions of the adhesion regions 35 and 45 in the respective separators 30 and 40, and the second protrusions 35B-2 and 45B-2 are formed at the outer positions. Accordingly, a sufficient amount of the adhesive 60 can be accumulated in spaces S1 and S2 disposed between these protrusions. That is, although the adhesive 60 before the hardening is likely to flow, since the clearances between the protrusions 35B and 45B and the frame portion 50 is made to be narrow, the flowing the adhesive 60 from the insides of the spaces S1 and S2 to the outside more than necessary is reduced.

Accordingly, the spaces S1 and S2 between the flat portions 35A and 45A of the adhesion regions 35 and 45 and the frame portion 50 can be gaplessly filled with the adhesive 60, making it possible to configure the adhesive thicknesses at the flat portions 35A and 45A to be the desired thicknesses. Consequently, the adhesive strength of the adhesive 60 at the flat portions 35A and 45A can be secured with more certainty.

Third Embodiment

Figure 8:
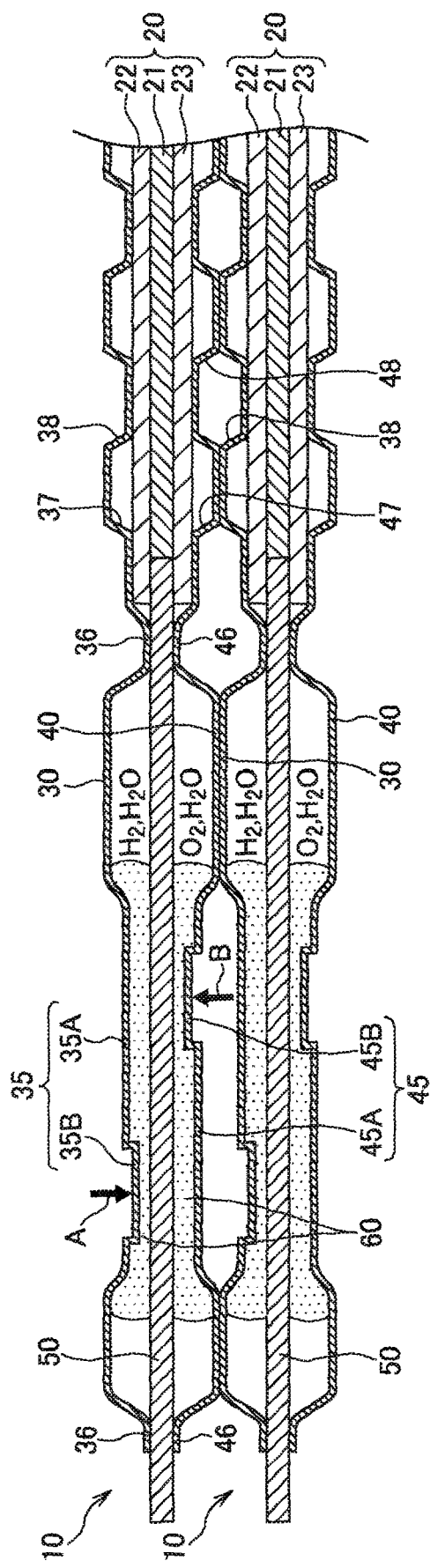
FIG. 8 is a partial vertical cross-sectional view of a fuel cell stack according to a third embodiment of the present invention.

The following describes the fuel cell 10 according to a third embodiment of the present invention with reference to FIG. 8. In the following embodiment, like reference numerals designate configurations and the like with functions corresponding or identical to those in the first embodiment, and therefore such configurations will not be further elaborated here.

The fuel cell according to the first embodiment includes the protrusion of the anode separator and the protrusion of the cathode separator opposed to one another across the frame portion. In contrast to this, the fuel cell 10 according to the third embodiment includes the protrusion 35B of the anode separator 30 and the protrusion 45B of the cathode separator 40 not opposed to one another across the frame portion 50.

As illustrated in FIG. 8, with the fuel cell 10, the protrusion 35B of the anode separator 30 is positioned displaced from the protrusion 45B of the cathode separator 40 in the inner-outer direction. More specifically, while the protrusion 35B of the anode separator 30 is disposed at the outer position in the adhesion region 35, the protrusion 45B of the cathode separator 40 is disposed at the inner position in the adhesion region 45.

In the fuel cell stack 100, a pressure difference between an anode gas pressure and a cathode gas pressure increases and decreases; therefore, the MEA 20 varies up and down in the drawing according to this increase and decrease of the pressure difference. It is apprehended that the variation of the MEA 20 acts the force in the inner-outer direction on the frame portion 50 and this results in pulling and coming off of the frame portion 50 adhered to the anode separator 30 and the cathode separator 40. The frame portion 50 is likely to be pulled and come off when the frame portion 50 is configured as a sheet-shaped member made of a resin.

With the fuel cell 10 according to this embodiment, the protrusion 35B of the anode separator 30 is positioned displaced from the protrusion 45B of the cathode separator 40 in the inner-outer direction. Accordingly, as indicated by arrows A and B, a remaining pressing force after the lamination acts on the frame portion 50 from the different upper and lower positions. Such action of the stress causes the frame portion 50 adhered to the respective separators 30 and 40 to be less likely to come off in the inner-outer direction; therefore, pulling and coming off of the frame portion 50 is reduced.

Figure 9:
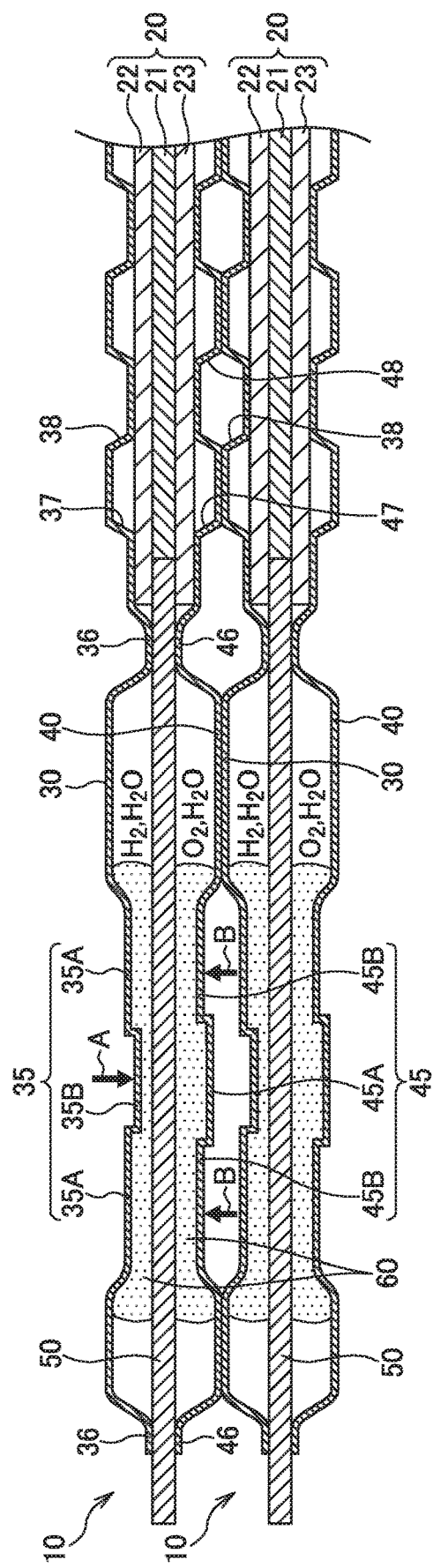
FIG. 9 is a partial vertical cross-sectional view of a fuel cell stack according to a modification of the third embodiment.

The following describes a modification of the fuel cell 10 according to the third embodiment with reference to FIG. 9.

As illustrated in FIG. 9, with the fuel cell 10 according to the modification, the anode separator 30 includes the one protrusion 35B and the cathode separator 40 includes the two protrusions 45B. The protrusion 35B of the anode separator 30 is disposed at the center position in the adhesion region 35. The two protrusions 45B of the cathode separator 40 are disposed avoiding the center position in the adhesion region 45. The one protrusion 45B is disposed inside with respect to the center position of the adhesion region 45. The other protrusion 45B is disposed outside with respect to the center position in the adhesion region 45.

The fuel cell 10 thus configured can also provide the effects similar to the fuel cell illustrated in FIG. 8, thereby ensuring reducing pulling and coming off of the frame portion 50.

The embodiments of the present invention described above are merely one illustration of application examples of the present invention and not of the nature to limit the technical scope of the present invention to the specific constructions of the above embodiments.

The fuel cells 10 according to the first to the third embodiments include the protrusions 35B and 45B as the protrusions having the rectangular cross-sectional surface. Meanwhile, the shape of the protrusions 35B and 45B is not limited to this shape. The protrusions 35B and 45B may be formed as protrusions having a U-shaped cross-sectional surface or a V-shaped cross-sectional surface. That is, it is only necessary that the protrusions 35B and 45B have a shape by which the adhesive thicknesses at the positions where these protrusions 35B and 45B are present can be thinner than the adhesive thicknesses at the other adhesion regions 35 and 45. Therefore, the protrusions 35B and 45B are not disposed in the separators 30 and 40 but protrusions projecting to the separator sides may be disposed at the frame portion 50 in the adhesion regions 35 and 45. Protrusions may be disposed both at the separators 30 and 40 and the frame portion 50.

While the abutting portions 39 and 49 of the separators 30 and 40 are formed inside and outside with respect to the adhesion regions 35 and 45 in the inner-outer direction, the abutting portions 39 and 49 may be formed only at the inside or the outside with respect to the adhesion regions 35 and 45.

The invention claimed is:

1. A fuel cell comprising:
  a membrane electrode assembly comprising an electrolyte membrane and an electrode layer, the membrane electrode assembly being provided between a first separator and a second separator, the first separator and the second separator defining gas flow passages configured to supply the membrane electrode assembly with anode gas or cathode gas;
  a frame portion disposed along an outer periphery of the membrane electrode assembly;
  an adhesion region provided between the frame portion and at least one of the first separator or the second separator, the adhesion region being bonded to the frame portion via an adhesive;
  adhesive accumulation portions provided at opposite portions outside of the adhesion region, where a distance between the frame portion and the at least one of the first separator or the second separator in the adhesive accumulation portions is larger than a distance between the frame portion and the at least one of the first separator or the second separator in the adhesion region; and
  a reduced portion in the adhesion region, where a distance between the frame portion and the at least one of the first separator or the second separator in the reduced portion is shorter than a distance between the frame portion and the at least one of the first separator or the second separator at portions of the adhesion region other than the reduced portion; wherein
  the at least one of the first separator or the second separator includes:
    a flat portion where an adhesive thickness between the flat portion of the at least one of the first separator or the second separator and the frame portion is approximately constant; and a protrusion where an adhesive thickness between the protrusion of the at least one of the first separator or the second separator and the frame portion is thinner than the adhesive thickness between the flat portion and the frame portion, the adhesive between the protrusion of the at least one of the first separator or the second separator and the frame comprising the reduced portion of the adhesion region;

an adhesive thickness between the at least one of the first separator or the second separator and the frame portion at the flat portion is less than an adhesive thickness between the at least one of the first separator or the second separator and the frame portion at the adhesive accumulation portions.

2. The fuel cell according to claim 1, wherein the at least one of the first separator or the second separator includes a plurality of protrusions in an inner-outer direction from an inner position close to the membrane electrode assembly to an outer position further from the membrane electrode assembly than the inner position.

3. The fuel cell according to claim 1, wherein the at least one of the first separator or the second separator includes a plurality of protrusions, and at least one of the protrusions is disposed at each of an inner position with respect to a center of the adhesion region and an outer position with respect to the center of the adhesion region.

4. The fuel cell according to claim 1, wherein:
the first separator comprises an anode separator and the second separator comprises a cathode separator, the anode separator being disposed at one surface side of the membrane electrode assembly, and the cathode separator being disposed at another surface side of the membrane electrode assembly,
the adhesion region is provided between the frame portion and the anode separator, and between the frame portion and the cathode separator, and
each of the anode separator and the cathode separator includes the protrusion, and the protrusion of the anode separator and the protrusion of the cathode separator are disposed at positions facing one another across the frame portion.

5. The fuel cell according to claim 1, wherein:
the pair of separators includes an anode separator and a cathode separator, the anode separator being disposed at one surface side of the membrane electrode assembly, and the cathode separator being disposed at another surface side of the membrane electrode assembly, and
each of the anode separator and the cathode separator includes the protrusion, and the protrusion of the anode separator and the protrusion of the cathode separator are disposed at positions displaced in an inner-outer direction from an inner position close to the membrane electrode assembly to an outer position further from the membrane electrode assembly than the inner position.

6. The fuel cell according to claim 1, wherein the adhesive accumulation portions are provided at opposite ends of the adhesion region, at an inside and an outside with respect to the adhesion region in an inner-outer direction from an inner position close to the membrane electrode assembly to an outer position further from the membrane electrode assembly than the inner position.

7. The fuel cell according to claim 1, wherein the adhesion region does not include the adhesive accumulation portions.

8. The fuel cell according to claim 1, wherein the adhesion region is provided between the frame portion and the first separator, and between the frame portion and the second separator.

9. The fuel cell according to claim 1, wherein
the at least one of the first separator or the second separator further includes an additional flat portion where an adhesive thickness between the additional flat portion of the at least one of the first separator or the second separator and the frame portion is approximately constant;
the adhesive thickness between the protrusion of the at least one of the first separator or the second separator and the frame portion is thinner than the adhesive thickness between the additional flat portion and the frame portion; and
the protrusion is provided between the flat portion and the additional flat portion in an inner-outer direction from an inner position close to the membrane electrode assembly to an outer position further from the membrane electrode assembly than the inner position.

10. The fuel cell according to claim 1, wherein the adhesive thickness between the protrusion of the at least one of the first separator or the second separator and the frame portion is constant.

11. The fuel cell according to claim 1, wherein the adhesive is present in the adhesive accumulation portions.

12. The fuel cell according to claim 1, wherein the adhesive only contacts one side of the first separator or the second separator with respect to a stacking direction of the fuel cell.

* * * * *